Jan. 16, 1962  G. ASAKAWA ETAL  3,016,691
CONVERTER OF ELECTRICAL ENERGY INTO MECHANICAL MOVEMENT
Filed Dec. 8, 1955
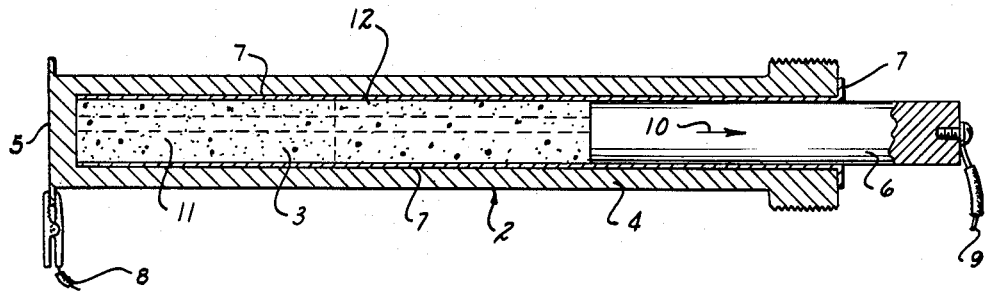
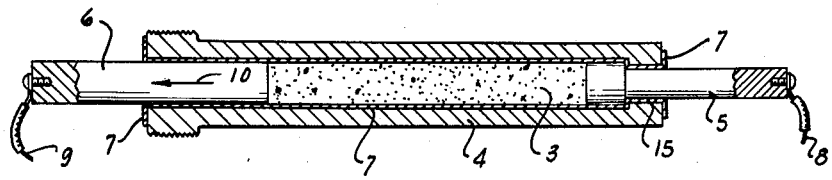
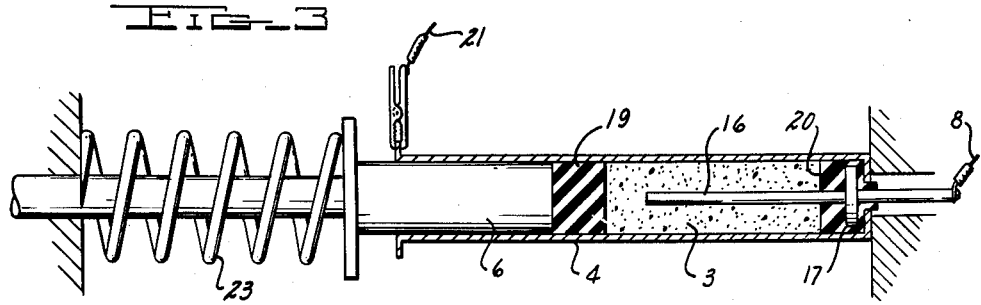
INVENTORS
GEORGE ASAKAWA
SERGIUS VERNET
BY
SMITH, OLSEN & KOTTS
ATTORNEYS

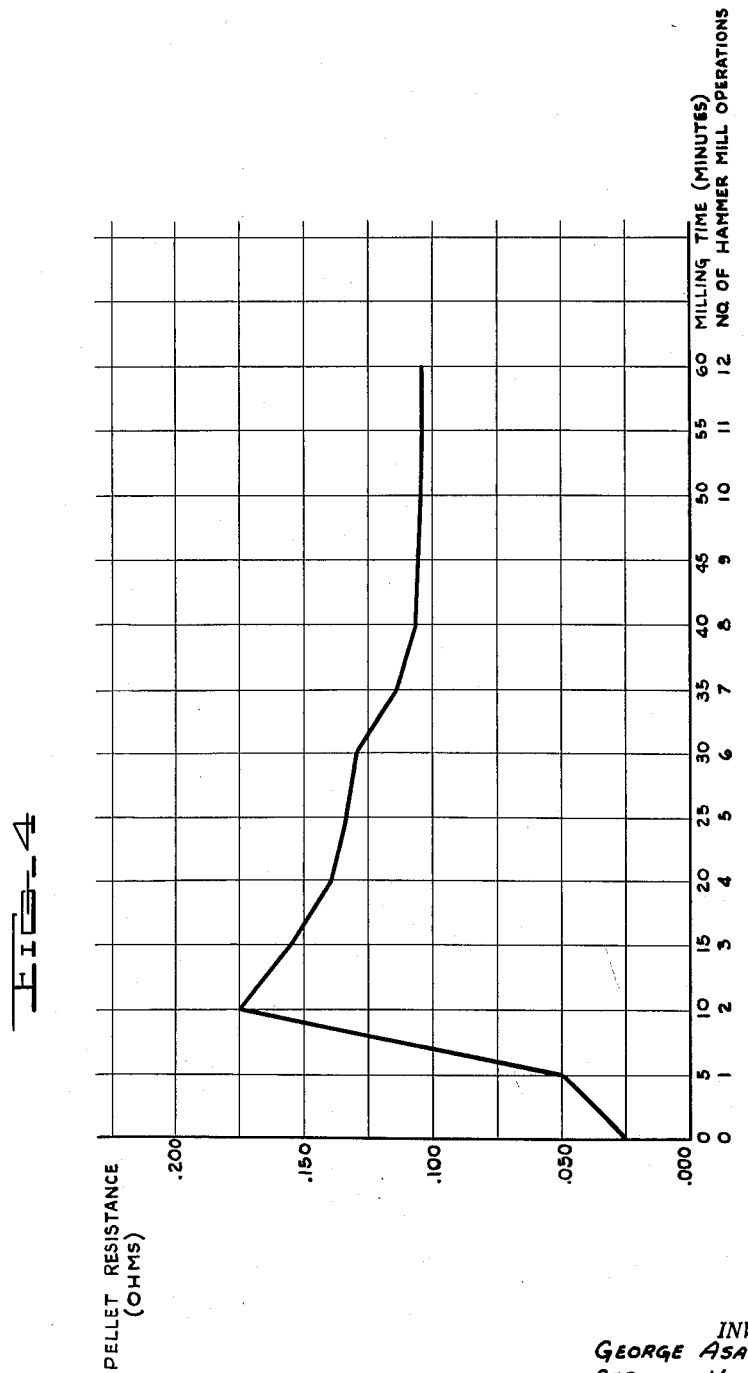

United States Patent Office 3,016,691
Patented Jan. 16, 1962

3,016,691
CONVERTER OF ELECTRICAL ENERGY INTO MECHANICAL MOVEMENT
George Asakawa and Sergius Vernet, Yellow Springs, Ohio, assignors, by mesne assignments, to Antioch College, Yellow Springs, Ohio, a corporation of Ohio
Filed Dec. 8, 1955, Ser. No. 551,829
12 Claims. (Cl. 60—23)

This invention concerns a device for converting electrical energy into mechanical movement, particularly, into translational movement of a solid body.

It is, of course, well known that mechanical movement can be derived from electrical energy by means of the common electric motor. The use of a motor, however, is subject to many limitations: first, because it is quite expensive for many uses; secondly, because it normally occupies a considerable space relative to the space which can be economically allotted to a control device in a compact unit; thirdly, because the mechanical movement within a motor is rotational and to convert rotational movement into translational movement requires additional mechanical elements.

There has been therefore a continuing demand for a simple, small, inexpensive unit capable of converting electrical energy into mechanical movement, particularly, translational movement. Typical of the attempts to accomplish this objective is that described in U.S. Patent No. 1,314,376 issued to J. H. Swan. The Swan patent describes an expansion motor wherein electrical current is passed through a low conductivity fluid in a manner such that the heat generated by the electrical resistance of the fluid causes an expansion of the fluid, which expansion in turn leads to the movement of a lever arm.

Such devices have continued to be quite bulky and their performance has been quite unpredictable. Despite attempts to hermetically seal the units loss of fluid, particularly through vaporization, causes the unit to have a short life since it loses its adjustment after a relatively few expansion-contraction cycles.

It is therefore an object of this invention to provide a relatively small, compact, simple, inexpensive device for converting electrical energy into mechanical movement.

It is a further object to convert electrical energy into translational mechanical movement.

It is a still further object of the invention to provide an expansion material which is more easily contained than the vapor forming expansion materials used heretofore.

It is a still further object of the invention to provide a convertor of electrical energy into mechanical movement which produces a relatively constant degree of movement over a relatively long period of usage and after numerous expansion-contraction cycles.

I have now found that the foregoing and related objects can be secured in a device for converting electrical energy into mechanical movement comprising a housing; a body of thermally expansible, poorly electrically conductive material within said housing; said body comprising a mixture of finely divided electrically conductive particles dispersed in a thermally expansible, non-conductor of electricity; spaced electrodes in electrical contact with said body for the conduction of electric current through said body; and a solid surface movable with respect to said housing and subject to the force of expansion of said body.

By the use of a poorly conducting expansible body comprising a finely divided conductor dispersed in a thermally expansible, non-conductor of electricity, the invention provides a relatively small, compact unit wherein the expansible body remains substantially in the solid form. It is, therefore, of particular use where size and economy are factors as well as where loss of calibration (as by leakage of the expansible composition) is an undesirable factor.

In the drawings:

FIG. 1 is a sectional view through one embodiment of the invention,

FIG. 2 is a sectional view through a second embodiment of the invention, and

FIG. 3 is a sectional view through a third embodiment of the invention,

FIG. 4 is a graph wherein the resistance of a pellet of the present expansible composition is plotted against the degree of mixing.

In FIG. 1 there is shown a device capable of converting electrical energy into translational mechanical movement. The device comprises a housing 2 and a body 3 of a thermally-expansible, poorly electrically conductive material. The body 3 in turn comprises a mixture of finely divided electrically conductive particles 11 dispersed in a thermally expansible non-conductor of electricity 12.

Housing 2 includes a cylindrical side wall 4, a fixed end wall 5, and a movable end wall or piston 6. Electric insulator means 7 in the form of a ceramic coating extends along the interior surface of wall 4. Lead-in electrical conductors 8 and 9 are connected to end walls 5 and 6, said end walls acting as electrodes. Current flow from an external source (not shown) through the conductor 8 is transmitted through the electrode 5, the body 3, the electrode 6 and the conductor 9. The insulator means 7 prevents the current from short circuiting the body 3 by going through wall 4.

Current flow in body 3 takes place through the conductive particles and through the films of substantially non-conducting, thermally expansible material in the spaces between the conducting particles. The resistive character of this composition causes the composition to heat and thereby expand the thermally expansible material. In this manner the expansion of body 3 causes the movable wall or piston 6 to move in the direction of the arrow 10. As the expansion of the body 3 occurs the particles 11 are spread apart which action causes an increase in the resistance of the body 3 to current flow. Thus expansion of the material 12 is not unlimited and the movement of the piston is usually limited to several tenths of an inch per one inch length of the expansion body. Such a limitation on expansion and on current carrying capacity is desirable in that it prevents an overheating of the materials as will be described hereinafter.

A spring (not shown in FIG. 1) is preferably provided for returning piston 6 to its illustrated position during cooling and consequent contraction of body 3.

The device illustrated in FIG. 2 is very similar to that of FIG. 1 except that the fixed end wall 5 becomes a separate electrode structure insulated from the cylindrical side wall 4 by insulator means 7. Operation and functioning of the FIG. 2 device is the same as that of the FIG. 1 device except that wall 4 is completely insulated from the current between the electrode 5 and the electrode 6.

The device illustrated in FIG. 3 includes a cylindrical electrode 16 extending from the fixed end wall 17 into the body of the poorly conducting expansible material 3 toward movable end wall 6. Rubber insulation means 19 and 20 are provided to insure that current passes from the electrode 16 to the cylinder wall through a substantial portion of the composition 3. Current flow is through the conductor 8, the end wall 17, the cylindrical electrode 16, the body 3, cylinder wall 4 and the conductor 21. A spring 23 is provided for returning movable end wall 6 into the housing during cooling and contraction of body 3. Where necessary in this latter construction, the piston 6 can be insulated from the cylinder wall 4.

Although the expansion materials are referred to as "non-conductors," it will be understood by those skilled in the art that the term "non-conductor" is a relative one and that the materials referred to do conduct small quantities of electricity but offer a high resistance to its passage. In this sense the expansion materials must be non-conductors of electricity and may be high melting waxes, polyethylene, polytetrafluoroethylene, dibromobenzene, paraffin, vinylchloride, vinylidenechloride, silicone gums and like materials. From the standpoint of ease of mixing and stability at high temperature I prefer to use polyethylene either alone or in mixtures with other plastic materials. I have found that the best expansion material consists of about two parts polyethylene and one part polytetrafluoroethylene. Materials such as polyethylene are subject to slow oxidation at elevated temperatures but this oxidation can be prevented by the addition of a suitable antioxidant. A particular valuable antioxidant for use with polyethylene is p-(benzyloxy)phenol in about 0.5 percent concentration.

The conductive material can be a metal; carbon such as carbon black; silicon, silicon carbide; a metal sulfide such as those of lead, iron, and molybdenum; and the like. I have found carbon black most suitable.

The proportion of conductor to expansible material varies somewhat depending on the nature of the conductor and its particle size. Metals, in particle sizes larger than about 40 microns, for example, comprise about 75 percent of the pellet volume. In the case of carbon black, in particle size of about 20–500 millimicrons, the conductor occupies about 40 percent of the pellet volume.

Although, as indicated, I may use relatively larger particle sizes (e.g. 40 microns) in relatively higher proportions (e.g. 75 percent), I have found that the most suitable compositions are those which include a more finely divided conductor (e.g. 20–500 millimicrons) in a relatively smaller proportion (e.g. 40 percent). It is probably for this reason that carbon black has been found to be the most suitable conductor. In addition to its contribution in the form of small particles, carbon black has stability at high temperatures and proper resistance at low concentration.

In order to obtain a homogeneous mixture with the proper electrical resistance it is necessary that the composition be mixed effectively. Any one of three methods can be used for effective mixing.

(1) Solvent method: With polyethylene and carbon black by way of example, polyethylene is dissolved in a solvent such as xylene and carbon black is added to the solution. The suspension is stirred vigorously until all the carbon globules are dispersed and preferably until none are visible under a microscope. The solvent may then be evaporated to leave a composition of finely divided carbon black dispersed in polyethylene.

(2) Mortar mixing: The ingredients are ground together in a dry state. This method is not applicable to the softer and more compressible material such as a silicone gum or polytetrafluoroethylene. As indicated by its title the method consists in grinding together in a mortar the desired ingredients until a homogeneous mix is obtained.

(3) Mill mixing: In this method the plastic material may be taken onto a two roll rubber mill. The end product of the mixing operation is a thin, brittle sheet of the mix. This material is easily ground to a fine powder by a hammer mill and is then in a form from which a pellet can be made.

When the composition of conductor and expansible materials has been suitably mixed the material is loaded into a pellet former of a diameter slightly less than the internal diameter of the finished cartridge. With polyethylene, polytetrafluoroethylene and graphite, for example, the pellet former is heated to about 300° F., above the softening point of polyethylene, and is then compressed and allowed to cool slowly. Slow cooling is recommended to prevent the possibility of pocket formation due to rapid contraction.

FIG. 4 illustrates the effect of mill mixing on the pellet resistance of a mixture of 40 percent polyethylene, 20 percent tetrafluoroethylene, and 40 percent carbon black wherein the pellet is 0.6 inch long and weighs about 0.15 gram. The initial low resistance and a rise to a peak are characteristic of the mill mixing. Low initial resistance is probably caused by loose carbon black around the plastic particles. With some milling part of the carbon black is forced into the plastic and out of the direct electric circuit causing a rise in resistance. Continuing milling works all the black into the plastic and eventually produces a resistance which does not change with continued milling. This method is by far the most successful. Besides forming a product of superior physical properties it has an added advantage in providing an end point to indicate that the mixing is complete.

As indicated previously it is desirable to prevent the poorly conducting-expansible body from reaching temperatures which would cause decomposition of the organic materials present. Similarly, it is desirable to prevent the expansible material from melting or softening to an extent sufficient to effect the even distribution of the conducting particles through coagulation or the like.

It is one of the features of the invention that the degree of heating can be controlled and the overheating of the expansible body can be easily avoided. Because of the fact of expansion, the conducting particles are pushed farther apart as the temperature increases. The increase in temperature thus increases the electrical resistance of the unit. With the percentage compositions given previously, the expansion characteristics are such as to effectively shut off current flow through the unit at temperatures safely below the melting or critically softening point. Where it is desirable to use a specific conductor or a specific non-conducting heat-expansible material for which specifications are unknown it is a matter of only a few simple tests to determine the most favorable percentage of ingredients. Thus if a given composition gets too hot it is necessary merely to decrease somewhat the percentage of conductor. A few such trials will yield a satisfactory proportion.

Although many uses of the invention will be apparent, particularly in the field of control devices; the device is particularly valuable in controlling fluid valve operation. In this latter use it is necessary merely to secure the movable wall or piston to a movable member or lever arm controlling the opening and closing of a valve and thus make the operation of the valve responsive to an electric current through the control device. Similarly, the movement of switches and the like can be controlled.

I claim:

1. A device for converting electrical energy into mechanical movement comprising a chamber-forming housing having wall portions including a movable wall; a solid body of thermally-expansible, electrically-conductive material within the housing chamber; said body comprising a mixture of finely divided electrically conductive, resistive particles dispersed in a thermally expansible, non-conductor of electricity; electric insulator means between two wall portions of the housing to electrically isolate said wall portions from each other except for the thermally-expansible, electrically-conductive body; each of said wall portions being in extended surface contact with the thermally-expansible, electrically-conductive body to constitute an electrode for the conduction of an electric current through said body; whereby current flowing through the body solely by the flow of current from particle-to-particle between the electrodes will heat said body so as to expand the expansible material and move the movable wall and the expansion of said expansible material increasing the spacing between the particles to reduce the current flow therethrough in proportion to the degree of expansion of said material.

2. The combination according to claim 1 wherein the electrodes are fixed relative to one another.

3. The combination of claim 1 wherein the finely divided particles are formed of carbon black.

4. The combination of claim 3 wherein the thermally-expansible material is formed of a mixture of polyethylene and polytetrafluoroethylene.

5. The combination of claim 1 wherein the finely divided particles have a particle size in the range of about 20 millimicrons to about 40 microns.

6. A device for converting electrical energy into mechanical movement comprising a chamber-forming housing having one fixed end wall and one movable end wall constituting a piston; a solid body of thermally-expansible, poorly electrically-conductive material within the housing chamber; said body comprising a mixture of finely divided electrically-conductive particles dispersed in a thermally-expansible, non-conductor of electricity; electric insulator means between said fixed end wall and piston to electrically isolate said end wall and piston from each other except for the thermally-expansible, electrically-conductive body; each of said fixed end wall and piston being in contact with the thermally-expansible, electrically-conductive body to form two electrodes for the conduction of electric current through said body; whereby current flowing through the body between the electrodes will heat said body so as to expand the expansible material and move the piston.

7. A device for converting electrical energy into mechanical movement comprising: a chamber-forming housing having wall portions including a movable wall forming a piston; a solid body of thermally-expansible, poorly electrically-conductive material within the housing chamber and in face-to-face contact with said piston; said body comprising finely divided particles formed of a conductor of electricity selected from the group consisting of metal, carbon, silicon, silicon carbide, lead sulfide, iron sulfide, and molybdenum sulfide, said particles being substantially homogenously dispersed in a solid thermally-expansible, non-conductor of electricity selected from the group consisting of high melting waxes, paraffin, polyethylene, polytetrafluoroethylene, dibromobenzene, vinyl chloride, vinylidene chloride, and silicone gums; electric insulator means between two wall portions of the housing to electrically isolate said wall portions from each other except for the thermally-expansible, electrically-conductive body, each of said wall portions being in contact with the thermally-expansible, electrically-conductive body to constitute an electrode for the conduction of electric current through said body; whereby current flowing through the body and conducted from particle-to-particle between the electrodes will heat said body so as to expand the expansible material and move the piston, expansion of said material increasing the spacing of said particles from one another to reduce the electrical conductivity of the solid body in direct proportion to the degree of expansion thereof.

8. A device for converting electrical energy into mechanical movement comprising a housing having a tubular side wall, a fixed end wall, and a movable end wall having an internal surface area substantially the same as that of the fixed end wall to define a chamber of constant cross section when measured at right angles to said side wall; electric insulator means extending between the end walls along the interior face of the side wall and defining an interior space of uniform cross section; and a solid body of thermally-expansible, electrically-conductive material within said housing in the aforementioned space; said body comprising a mixture of electrically conductive, resistive particles and thermally-expansible material which is a non-conductor of electricity; each of said end walls being in contact with said solid body and forming electrodes for the conduction of electric current through said body.

9. A device for converting electrical energy into linear motion, comprising a housing having a peripheral wall enclosing a space and a pair of spaced end walls engaging the peripheral wall, at least one of said end walls being linearly displaceable while remaining in engagement with said peripheral wall, said end walls being electrically insulated from the peripheral wall, a solid body of thermally-expansible, poorly electrically conductive material filling said housing space and in contact with each of said end walls, said body comprising a plurality of finely particulated electrically conductive particles substantially uniformly dispersed within a solid thermally expansible, electrically non-conductive matrix, and means connecting said end walls, respectively, to electrical leads of opposite polarity receiving current from a source of electricity, the current necessarily flowing from one end wall to the other end wall only through said body and the current flow through said body progressing from electrically conductive particle to electrically conductive particle through the non-conductive matrix to heat the matrix, thereby expanding the matrix and linearly displacing said at least one end wall, and the expansion of the matrix as the body is heated increasing the particle-to-particle spacing and increasing the resistance of the body to further current flow therethrough to thereby prevent overheating of the body.

10. In a device for converting electrical energy into linear motion, including a housing defining an interior space and having a pair of spaced relatively linearly movable end walls, said end walls being electrically insulated from the remainder of the housing, the improvements of a solid body of thermally-expansible, poorly electrically conductive material filling said housing space and in contact with each of said end walls, said body comprising a plurality of minute electrically conductive particles substantially uniformly dispersed throughout a thermally expansible, electrically non-conductive matrix, the matrix surrounding and separating the individual particles, and means connecting said end walls, respectively, to a source of electrical current so as to accommodate current flow from end wall to end wall only through said body, the current flow through said body progressing from electrically conductive particle to electrically conductive particle to heat the matrix, the resultant thermal expansion of the matrix (1) linearly displacing said at least one end wall, and (2) increasing the particle-to-particle spacing to correspondingly increase the resistance of the body to further current flow therethrough.

11. A device for converting electrical energy into linear motion, comprising a housing having a peripheral wall enclosing a space and a pair of spaced end walls sealingly engaging the peripheral wall, one of said end walls being linearly displaceable relative to the other end wall while remaining in sealed engagement with said peripheral walls, said end walls each being electrically insulated from the peripheral wall, a solid body of thermally-expansible, poorly electrically conductive material filling said housing space and in full contact with each of said end walls, said body comprising a plurality of finely particulated electrically conductive particles substantially uniformly dispersed within and separated from one another by a thermally expansible, electrically non-conductive matrix, and means for flowing an electric current from one end wall to the other end wall only through said body, the current flow through said body heating the matrix, thereby expanding the matrix and linearly displacing said one end wall, and the expansion of the matrix as the body is heated increasing the particle-to-particle spacing and the resistance to current flow between the particles to thereby prevent overheating of the body.

12. A device as claimed in claim 1, wherein one of said wall portions carries an elongated electrode projecting into the body of material confined in said housing, said electrode being spaced from said housing to force current to pass through at least a portion of said body whereby to expand the expansible material and move the movable wall.

References Cited in the file of this patent
UNITED STATES PATENTS

| | | |
|---|---|---|
| 861,310 | Nolen | July 30, 1907 |
| 1,314,376 | Swan | Aug. 26, 1919 |
| 1,534,269 | Klugh | Apr. 21, 1925 |
| 2,066,345 | Greby | Jan. 5, 1937 |
| 2,270,199 | Thrune | Jan. 13, 1942 |
| 2,368,182 | Vernet | Jan. 30, 1945 |
| 2,489,896 | Kempton | Nov. 29, 1949 |
| 2,548,708 | Dickey | Apr. 10, 1951 |
| 2,730,597 | Podolsky et al. | Jan. 10, 1956 |

UNITED STATES PATENT OFFICE
CERTIFICATE OF CORRECTION

Patent No. 3,016,691                          January 16, 1962

George Asakawa et al

It is hereby certified that error appears in the above numbered patent requiring correction and that the said Letters Patent should read as corrected below.

Column 4, lines 70 and 71, for "through said body; whereby current flowing through the body solely by the flow of current from particle-to-particle" read -- through said body solely by the flow of current from particle to particle; whereby current flowing through the body --.

Signed and sealed this 8th day of May 1962.

(SEAL)
Attest:

ERNEST W. SWIDER
Attesting Officer

DAVID L. LADD
Commissioner of Patents